United States Patent [19]
Ohta et al.

[11] Patent Number: 4,623,044
[45] Date of Patent: Nov. 18, 1986

[54] BRAKE APPARATUS
[75] Inventors: Ryuji Ohta, Kamifukuoka; Michio Kobayashi, Hiki, both of Japan
[73] Assignee: Jidosha Kiki Co., Ltd., Tokyo, Japan
[21] Appl. No.: 682,040
[22] Filed: Dec. 14, 1984
[30] Foreign Application Priority Data
Dec. 22, 1983 [JP] Japan ................................ 58-240880
Dec. 24, 1983 [JP] Japan ................................ 58-243096
Dec. 27, 1983 [JP] Japan ................................ 58-244667
[51] Int. Cl.⁴ ............................................. B16D 65/21
[52] U.S. Cl. .................... 188/72.1; 188/158; 188/370
[58] Field of Search ............... 188/155, 156, 157, 158, 188/159, 160, 161, 162, 163, 164, 72.1, 72.3, 72.4, 72.5, 72.6, 369, 370; 310/328, 13; 192/84 R

[56] References Cited
U.S. PATENT DOCUMENTS 1,990,971  2/1935  Apple .................................... 188/163
2,084,388  6/1937  Dodge .................................. 188/326
3,064,769 11/1962  Billmeyer ......................... 188/251 R
3,374,823  3/1968  Ford ...................................... 310/13
3,551,764 12/1970  Evans .................................. 310/328
3,684,904  8/1972  Galutva et al. ..................... 310/328
3,852,626 12/1974  Davis ...................................... 310/13
3,902,085  8/1975  Bizzigotti ............................ 310/328
4,471,256  9/1984  Igashira et al. ..................... 310/328

FOREIGN PATENT DOCUMENTS
1066345 11/1979  Canada ................................ 310/328

Primary Examiner—Duane A. Reger
Assistant Examiner—Alvin Oberley
Attorney, Agent, or Firm—Townsend and Townsend

[57] ABSTRACT

A brake apparatus has an actuator mechanism for bringing a friction member into tight contact with a braking member so as to obtain a braking force, the actuator mechanism including: a moving piezoceramic member which can be elongated/contracted along a direction in which the friction member is urged; a holder disposed between opposing ends of the friction member and the moving piezoceramic member to couple the friction member and the moving piezoceramic member; and members for selectively restraining movement of the moving piezoceramic element in a direction parallel to the direction in which it is urged with respect to a fixing member.

16 Claims, 22 Drawing Figures

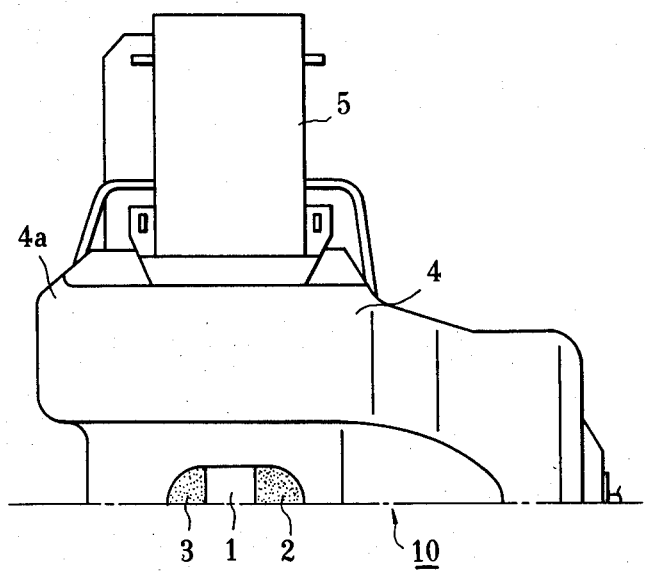
F I G. 1
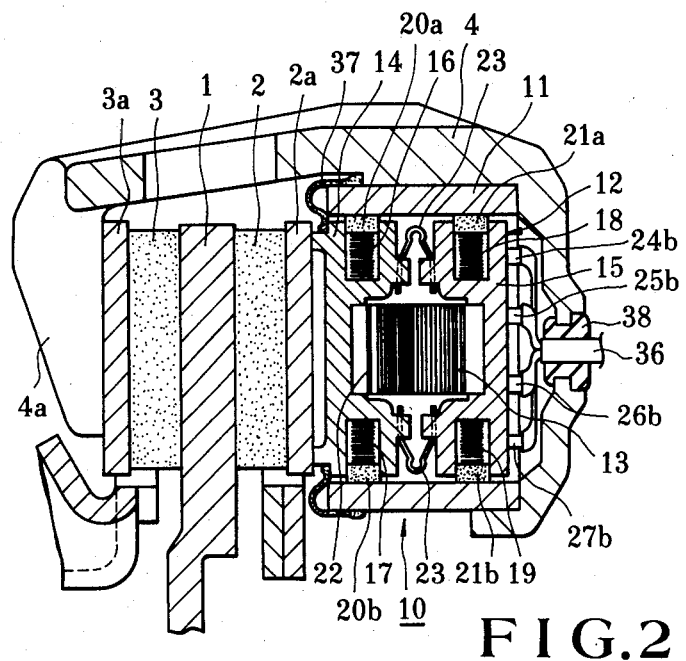
F I G. 2

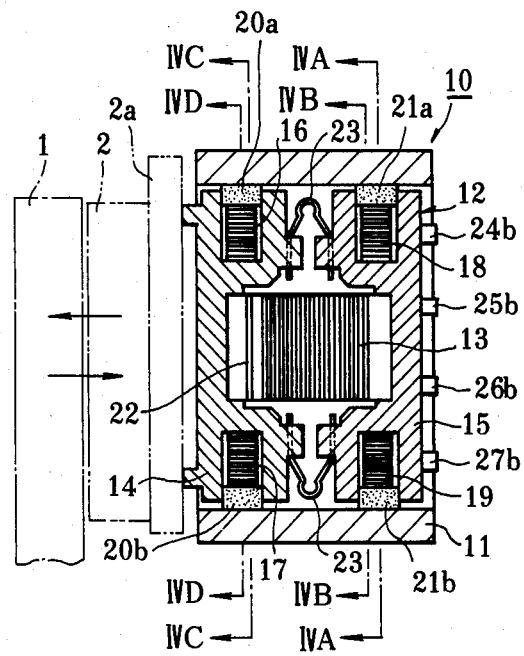
FIG.3
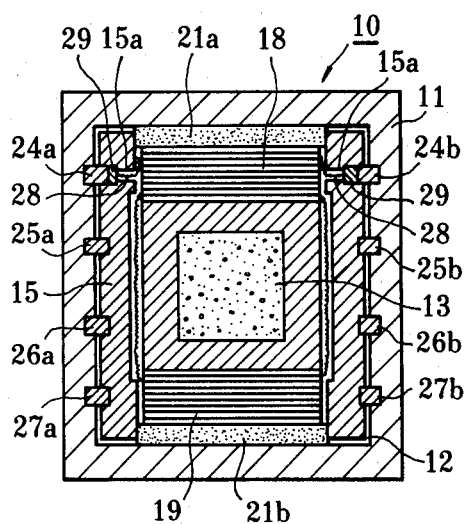 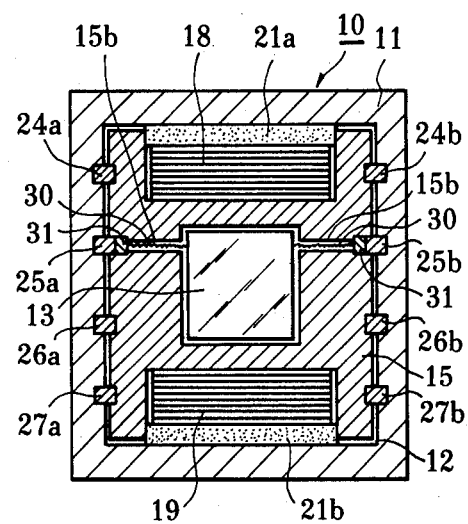
FIG.4(A)　　　FIG.4(B)

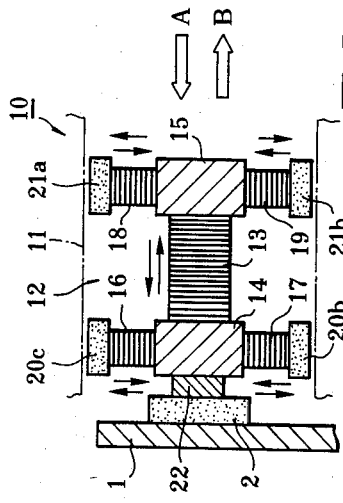
FIG.6
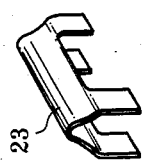
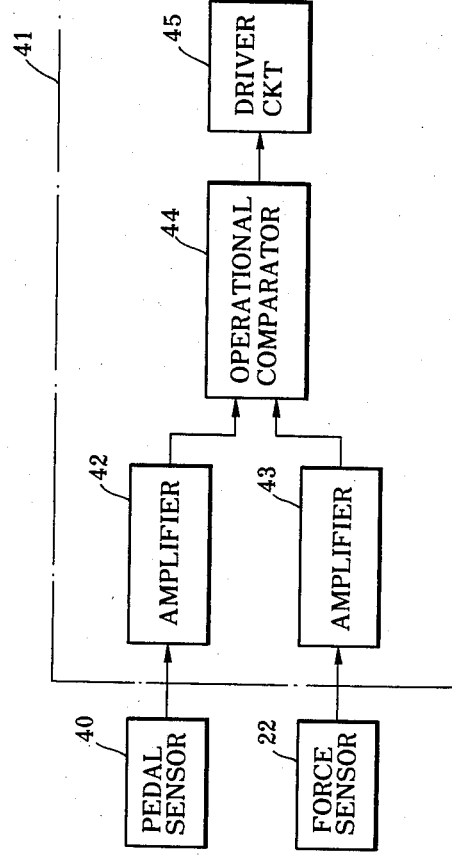
FIG.7
FIG.8

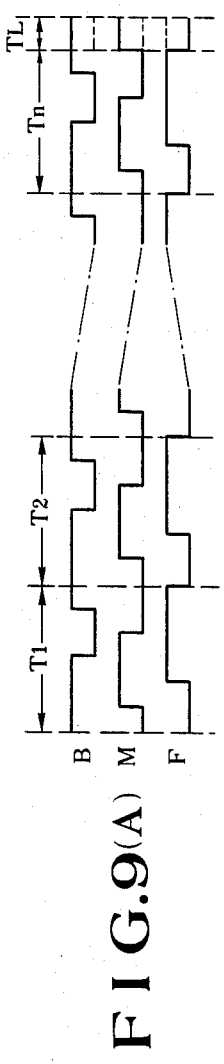
FIG.9(A)
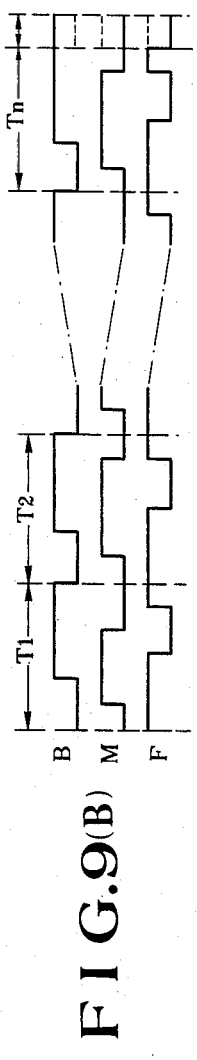
FIG.9(B)
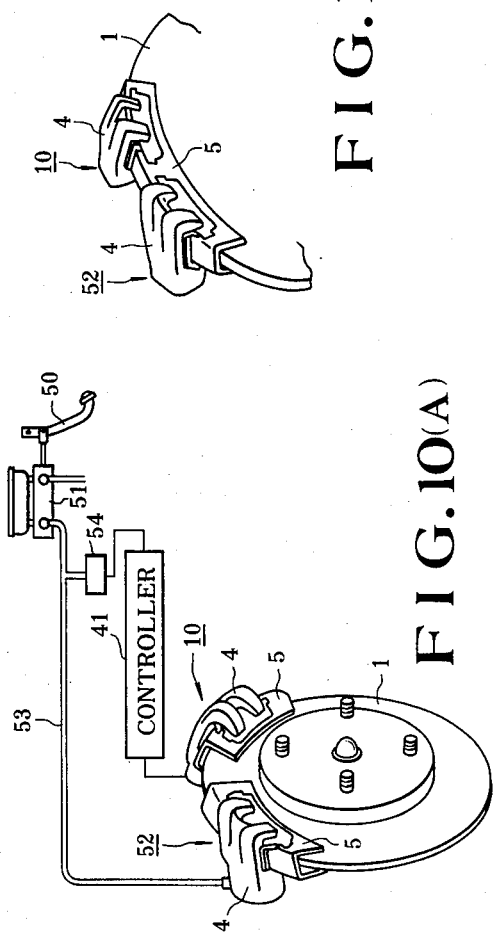
FIG.10(A)
FIG.10(B)

BRAKE APPARATUS

BACKGROUND OF THE INVENTION

The present invention relates to a brake apparatus effectively using a piezoceramic actuator for producing a braking force.

Brake apparatuses for controlling a vehicle speed or stopping a vehicle are generally classified into drum and disc brakes. The disc brake produces a braking force by bringing friction pads into tight contact with a disc so as to clamp the disc. With a disc brake, a stable and uniform distribution of the braking force can be obtained. In addition, the disc brake has a high heat resistance, an automatic braking force adjustment mechanism can be easily mounted on the disc brake apparatus, and braking noise is minimal. The drum brake apparatus does not have these advantages. For this reason, the disc brake apparatus has prevailed.

In conventional brake apparatuses, a hydraulic cylinder system as a power transmitting means is adapted as an input actuator mechanism to transmit a hydraulic/pneumatic pressure. The friction pads are brought into tight contact with or are separated from the disc in accordance with the depression/release of a brake pedal. In the hydraulic actuator mechanism, a braking force obtained only upon depression of the brake pedal is limited, so a force amplifying device consisting of a master cylinder, a servo unit and so on is adapted to increase the clamping force of the friction pads with respect to the disc.

However, any conventional brake apparatus using the hydraulic actuator mechanism described above requires a master cylinder, a booster, a wheel cylinder and brake fluid piping, resulting in a complicated construction and cumbersome molding and assembly. This leads to not only high cost but also requires extra mounting space. As a safety measure, a plurality of independent brake systems are often arranged in parallel with each other. In this case, the above drawbacks become decisive.

Demand has recently arisen for brake control including a variety of applications such as an anti-skid mechanism. The conventional hydraulic brake apparatuses cannot satisfy this demand.

In order to overcome the conventional drawbacks, an actuator mechanism in the brake apparatus comprises an electric motor or a slurry clutch, as described in Japanese Patent Disclosure No. 56-31532. An electromagnetic brake is used in an actuator mechanism, as described in International Application No. PCT/DE82/00172 (International Disclosure No. W083/01044). Unlike other conventional actuator mechanisms which are mechanically operated, these actuator mechanisms are electrically operated, so that a proper braking force can be quickly produced in a flexible manner.

According to the conventional brake apparatus using the electrical actuator mechanism of the type described above, wiring from the brake pedal can be simplified, but the actuator body opposing the disc is large. The construction of the actuator mechanism is complicated, resulting in high cost and high power consumption. As a result, there is much room for improvement in this conventional brake apparatus.

SUMMARY OF THE INVENTION

It is an object of the present invention to provide a brake apparatus using a piezoceramic actuator which has lately received a great deal of attention;

It is another object of the present invention to provide a simple low-cost brake apparatus for producing a proper and accurate braking force.

It is still another object of the present invention to provide a compact, lightweight brake apparatus wherein complicated brake control can be properly and easily performed in a variety of applications.

According to an aspect of the present invention, there is provided a brake apparatus having an actuator mechanism for bringing a friction member into tight contact with a braking member so as to obtain a braking force, the actuator mechanism comprising:

a moving piezoceramic member which can be elongated/contracted along an urging direction of the friction member;

a holder disposed between opposing ends of the friction member and the moving piezoceramic member to couple the friction member and the moving piezoceramic member; and means for selectively restraining movement of the moving piezoceramic element with respect to a fixing member in a direction parallel to the urging direction.

BRIEF DESCRIPTION OF THE DRAWINGS

FIGS. 1 and 2 are respectively a plan view and a sectional side view of a brake apparatus according to an embodiment of the present invention;

FIG. 3 is a sectional view showing a schematic construction of an actuator mechanism as a main feature of the present invention;

FIGS. 4A to 4D are sectional views of the actuator mechanism taken along the lines IVA—IVA, IVB—IVB, IVC—IVC and IVD—IVD of FIG. 3, respectively;

FIG. 6 is a perspective view of a U-shaped leaf spring mounted between holders for holding two ends of a moving piezoceramic element;

FIG. 7 is a representation for explaining movement of a movable assembly subjected to intermittent shifting;

FIG. 8 is a block diagram of a control circuit of the movable assembly;

FIGS. 9A and 9B are respectively timing charts showing waveforms of voltages applied to respective piezoceramic elements;

FIGS. 10A and 10B are respectively perspective views showing a modification of the brake apparatus when it is actually mounted;

FIGS. 13A and 13B to 15 are views showing other modifications of the brake apparatus according to the present invention.

DESCRIPTION OF THE PREFERRED EMBODIMENTS

Figure 5:
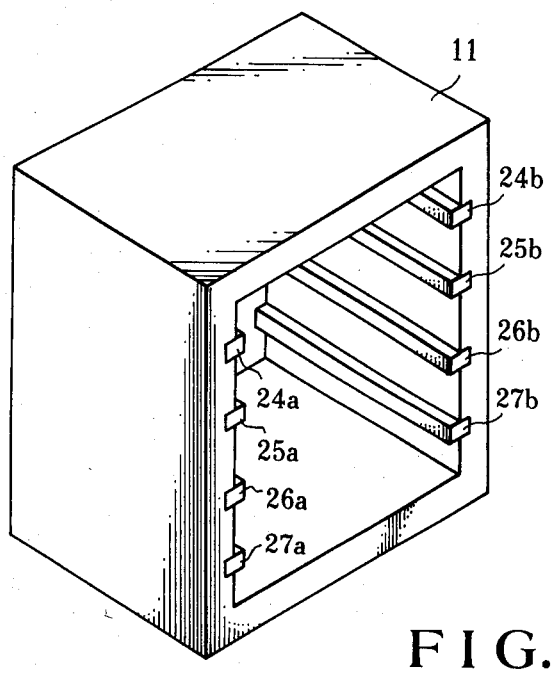
FIG. 5 is a perspective view showing a schematic construction of a housing of the actuator mechanism.

Preferred embodiments of the present invention will be described in detail with reference to the accompanying drawings.

FIGS. 1 and 2 show an embodiment wherein a brake apparatus according to the present invention is applied to a single cylinder brake apparatus. The overall construction of the brake apparatus will be described with reference to FIGS. 1 and 2. A disc 1 serves as a member subjected to braking and is rotated together with a wheel (not shown). Friction pads 2 and 3 serve as friction members selectively brought into tight contact with two surfaces of the disc 1 to provide a braking force. Pad plates 2a and 3a are mounted on surfaces of the friction pads 2 and 3 which oppose their surfaces in contact with the disc 1. An actuator mechanism 10 is arranged outside the friction pad 2 to cause it to reciprocate along a direction perpendicular to the surface of the disc 1. The actuator mechanism 10 is held at one end of a caliper body 4. The other end of the caliper body 4 sits astride the disc 1 and faces the outer surface of the friction pad 3. Pawls 4a and 4b (only one pawl is illustrated) are integrally formed with the caliper body 4, so that the pad 3 can be moved by the actuator mechanism 10 so as to be brought into contact with or separated from the disc 1 along a direction perpendicular to the surface of the disc 1. The caliper body 4 is slidably supported by a substantially U-shaped support bracket 5 which sits astride the disc 1. The caliper body 4 is of a floating type. The construction of such a caliper body 4 is known to those skilled in the art, and a detailed description thereof will be omitted.

In the disc brake apparatus described above according to this embodiment, the main feature lies in the fact that the actuator mechanism 10 comprises a sophisticated assembly using piezoceramic elements.

The construction of the disc brake apparatus in this embodiment will be described in detail with reference to FIGS. 3 to 5. A prism housing 11 has two open ends. A movable assembly 12 is slidably supported in the housing 11 to perform intermittent shifting by using piezoceramic elements. The movable assembly 12 comprises a movable piezoceramic element 13 which is aligned along the axial direction of the disc 1 and which is extended or contracted upon application of a voltage. The two ends of the movable assembly 12 are held by a pair of front and rear holders 14 and 15 which are slidably supported in the housing 11. The front and rear holders 14 and 15 comprise a pair of upper and lower restraining piezoceramic elements 16 and 17 and a pair of upper and lower restraining piezoceramic elements 18 and 19, respectively. Friction pads 20a, 20b, 21a and 21b of the piezoceramic elements 16, 17, 18 and 19 are extended or contracted along the direction perpendicular to the axial direction of the friction pads 20a, 20b, 21a and 21b to bring them into tight contact with or to separate them from the inner surface of the housing 11. In the movable assembly 12 having the construction described above, a force sensor 22 is arranged in front of the front end of the moving piezoceramic element 13 to detect a biasing force of the friction pad 2 applied against the disc 1 by means of the movable assembly 12. The force sensor 22 supplies a detection signal to a controller (to be described later).

A plurality of piezoelectric plates are stacked to obtain the integral moving piezoceramic element 13, and the force sensor 22 is formed integrally with the front end of the piezoceramic element 13. The reason for this is that the piezoceramic element has characteristics wherein it serves as an actuator for producing a displacement or a force when a voltage is applied thereto, and it also serves as a sensor for generating a voltage when a force acts thereon. In this manner, when the sensor 22 is formed integrally with the piezoceramic element 13, the number of components can be decreased, and simple molding, machining and/or assembly techniques can be used. However, the present invention is not limited to the above arrangement. For example, the force sensor 22 may be inserted in front of the front end of the movable assembly 12 between the pad plate 2a of the friction pad 2 and the holder 14. In this case, a separate urging member or part of the plate 2a applies a force to the force sensor held on the holder 14.

Referring to FIGS. 2 and 3, U-shaped leaf springs 23 serve as tension spring members and are attached to respective corresponding ends of the holders 14 and 15 so as to urge the holders 14 and 15 together. A detailed construction of the leaf spring 23 is illustrated in FIG. 6. These leaf springs 23 (upper and lower springs in this embodiment) do not apply a tension force on the ceramic element 13 when the disc brake apparatus is operated, thereby improving the durability of the piezoceramic element 13. At the same time, since a compression force continuously acts between the holders 14 and 15, the holders 14 and 15 need not be bonded to the piezoceramic element 13 when the movable assembly is assembled. The elastic member inserted between the holders 14 and 15 is not limited to the leaf spring 23, but can be extended to a tension coil spring. An elongation/contraction of the piezoceramic element 13 is as small as about 0.1% with respect to the length thereof. Therefore, a simple wire may be used as the elastic member.

As is apparent from FIGS. 4A to 4D, the friction pads 20a, 20b, 21a and 21b urged against the inner wall surface of the housing 11 by means of the restraining piezoceramic elements 16, 17, 18 and 19 are held to be movable vertically while their horizontal movement is restricted by the holders 14 and 15. In order to obtain the proper restrained state, the friction pads 20a, 20b, 21a and 21b must have high resistance to shearing force and a high friction coefficient. Each pad can therefore comprise zinc, cast iron, aluminum or a ceramic. A distance between the friction pad 20a, 20b, 21c or 21c and the inner wall surface of the housing 11 must be small enough to cause the piezoceramic elements 16, 17, 18 and 19 to obtain both the restrained and sliding states of the holders 14 and 15. For this reason, polishing is performed after the movable assembly 12 is mounted in the housing 11, or size adjustment is performed by shimming.

The prism housing 11 comprises an integral metal member made of aluminum or the like, as is apparent from FIGS. 3 to 5. The housing 11 has sufficient rigidity to movably hold the movable assembly 12 therein. When the housing 11 is formed such that an elongated material prepared by pultrusion or extrusion molding is cut at a predetermined length, it can be easily formed with simple machining techniques in a mass production line, thereby resulting in low cost.

As is apparent from FIGS. 2 to 5, four pairs of rail electrodes 24a and 24b, 25a and 25b, 26a and 26b, and 27a and 27b are fitted in the corresponding grooves formed in the inner side wall surfaces of the housing and extend along the axial direction of the disc 1. The rail electrodes 24a and 24b, 25a and 25b, 26a and 26b, and 27a and 27b are electrically connected to the piezoceramic elements 18 and 19, the piezoceramic element 13, the force sensor 22, and the piezoceramic elements 16 and 17, respectively, which are then commonly connected to the controller (to be described later). These pairs of rail electrodes 24a and 24b, 25a and 25b, 26a and 26b, and 27a and 27b also serve as guide members for guiding the movable assembly 12 to be brought into tight contact with or separated from the disc 1. It should be noted that an insulating material is inserted between the rail electrodes and the corresponding grooves in the housing 11.

Figure 4C:
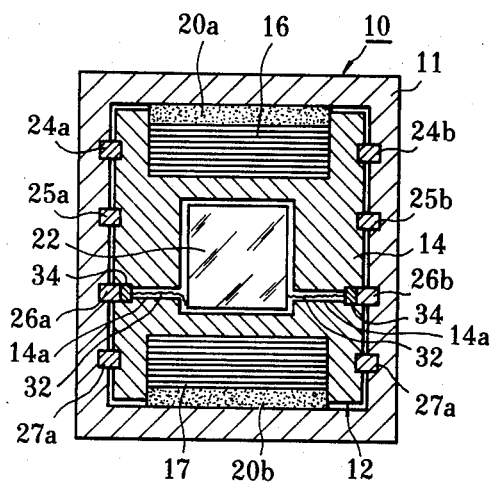
Figure 4D:
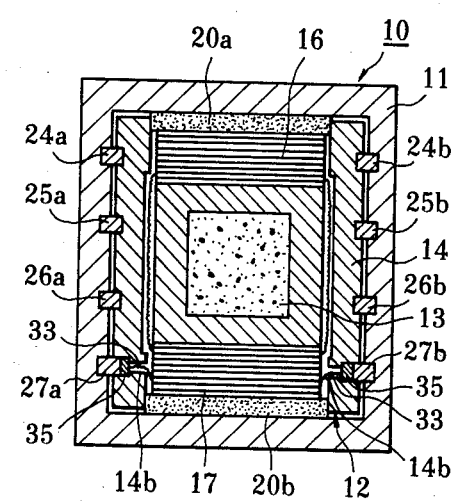

The detailed connections between the rail electrodes 24a and 24b, 25a and 25b, 26a and 26b, and 27a and 27b and the components in the movable assembly 12 are illustrated in FIGS. 4A to 4D. The first pair of rail electrodes 24a and 24b in the uppermost portion of the housing 11 are respectively connected through lead wires 28 and contact elements 29 to the piezoceramic elements 18 and 19 mounted in the rear holder 15, as shown in FIG. 4A. The lead wires 28 extend through holes 15a, and the contact elements 29 comprise, for example, leaf springs, respectively. Similarly, the second pair of rail electrodes 25a and 25b are connected to the piezoceramic element 13 through lead wires 30 extending through holes 15b and the contact elements 31, respectively, as shown in FIG. 4B. The third and fourth pairs of rail electrodes 26a and 26b and 27a and 27b are connected to the force sensor 22 and the piezoceramic elements 16 and 17 through lead wires 32 and 33 extending through holes 14a and 14b and contact elements 34 and 35, shown in FIGS. 4C and 4D, respectively.

With this construction, the piezoceramic elements 13, 16 and 17, and 18 and 19 are connected to the second, fourth and first pairs of rail elements 25a and 25b, 27a and 27b and 24a and 24b and to the controller through external lead wires 36 (FIG. 2).

Referring to FIG. 2, reference numeral 37 denotes a boot mounted at the front end of the housing 11 to seal the inner space of the housing 11; and 38, a bushing mounted on a terminal block of the external lead wires extending from the caliper body 4.

The actuator mechanism 10 having the construction described above is illustrated in principle in FIG. 7. A control circuit of this actuator mechanism 10 is illustrated in FIG. 8.

The arrangement and operation of the control circuit will be briefly described. Reference numeral 40 denotes a pedal sensor for detecting a pedaling force or a pedaling stroke. Detection signals from the pedal sensor 40 and the force sensor 22 are supplied to a controller 41. The controller 41 comprises amplifiers 42 and 43 for respectively amplifying signals from the sensors 40 and 22, an operational comparator 44 for comparing outputs from the amplifiers 42 and 43, and a driver 45 for supplying an output signal shown in FIGS. 9A or 9B to the moving piezoceramic element 13 (to be also referred to as a piezoceramic element M), and the front and rear restraining piezoceramic elements 16 and 17 (to be also referred to as piezoceramic elements F) and 18 and 19 (to be also referred to as piezoceramic elements B).

The operation order of the piezoceramic elements M, F and B will be described with reference to FIG. 9A. When the driver depresses the brake pedal, a voltage is applied to the rear restraining piezoceramic elements B, and the rear holder 15 is fixed in the housing 11. A voltage is then applied to the moving piezoceramic element M to extend it forward. Thereafter, the front restraining piezoceramic elements F are operated to fix the front holder 14. Thereafter, the rear piezoceramic elements B are released, and the piezoceramic element M is deenergized or applied with an inverted voltage.

The rear piezoceramic elements B are then restrained again. Thus, forward intermittent shifting of one cycle (T1, T2, ..., and Tn) in the A direction is completed. Such a cycle is repeated to bring the pad 2 closer to the disc 1 so as to eliminate the space therebetween.

The contact force of the pads is detected by the force sensor 22, and the movable assembly 12 is moved such that the voltage is controlled to produce a braking force corresponding to a degree of pedaling. In order to obtain the final locked state of the movable assembly 12, at least one of the front and rear piezoceramic elements F and B is operated.

When the force sensor 22 is formed integrally with the moving piezoceramic element 13, as shown in FIG. 3, only the rear piezoceramic elements 18 and 19 are restrained so as to detect a contact pressure in the locked state (TL), as indicated by the solid line in FIG. 9A. However, when the force sensor 22 is located in front of the front end of the movable assembly 12, as shown in FIG. 7, at least one of the front piezoceramic elements 16 and 17 and the rear piezoceramic elements 18 and 19 are controlled. In this case, the moving piezoceramic element 13 may be turned on or off with a positive or negative voltage. The above control operation can also be applied to the contraction of the moving piezoceramic element 13, as shown in FIG. 9B. A distance between the pad 2 and the disc 1 after the release of the pedal is determined by the number of times of intermittent shifts effected after a load on the force sensor 22 reaches a predetermined value.

Intermittent shifting for the contraction of the moving piezoceramic element 13 along the B direction in FIG. 7 is apparent from the timing chart in FIG. 9B, and a detailed description thereof will be omitted.

According to the actuator mechanism 10 using the piezoceramic elements so as to produce a braking force by intermittent shifting, a compact, lightweight disc brake apparatus can be provided wherein a proper braking force can be generated as soon as the driver depresses the brake pedal. By adjusting a control signal from the controller 41, various braking operations such as anti-skid and pump braking can be performed. The piezoceramic elements used in the disc brake apparatus have low power consumption and generate low heat and low noise. In addition, unlike the conventional hydraulic brake system, the installation space and cost can be greatly reduced.

In the restraining piezoceramic elements 16, 17, 18 and 19, a problem arises as to whether or not a sufficient restraining state is obtained by thrusts and displacements. Each of the piezoceramic elements 16, 17, 18 and 19 is made of a two-component (lead magnesium niobate and lead titanate) solid solution ceramic material and has a length of 20 mm and an area of 300 mm$^2$. When a voltage of 200 V is applied to this piezoceramic element, it generates a thrust of 500 kg and a displacement of about 0.01 mm (the displacement is doubled when a positive or negative voltage is applied to the piezoceramic element). In this manner, it is found that the proper restraining state can be obtained.

The present invention is not limited to the particular embodiment described above. The shape and construction of the respective components may be arbitrarily changed and modified.

The actuator mechanism 10 using the piezoceramic elements according to the present invention may be used in a conventional hydraulic cylinder type disc brake apparatus, as shown in FIG. 10A. Reference numeral 50 denotes a brake pedal; and 51, a master cylinder for generating a predetermined pressure upon depression of the brake pedal 50. A wheel cylinder 52 is operated by hydraulic pressure supplied from the master cylinder 51 through a pipe 53 and brings friction pads (not shown) attached to caliper bodies 4 into tight contact with a disc 1. The construction of the wheel cylinder is a conventional one which is known to those skilled in the art. The actuator mechanism 10 having the piezoceramic elements according to the present invention is mounted at a circumferential spaced position to be parallel to the wheel cylinder 52. A pressure sensor 54 serves as a means for transmitting a pedaling force from the brake pedal 50 to the controller 41 and is arranged midway along the pipe 53.

With this construction, the two brake systems are used together so as to improve safety. At the same time, when the brake pedal is depressed, these systems are simultaneously operated to cause the electrical actuator mechanism 10 of the present invention to substitute for an output from the conventional hydraulic system booster. In addition, brake control such as anti-skid can be electronically controlled by the controller 41.

In the arrangement in FIG. 10A, the respective actuator mechanisms are spaced apart on the circumferential surface of the disc 1. However, as shown in FIG. 10B, support brackets 5 of these mechanisms may be integrally formed.

Figure 11:
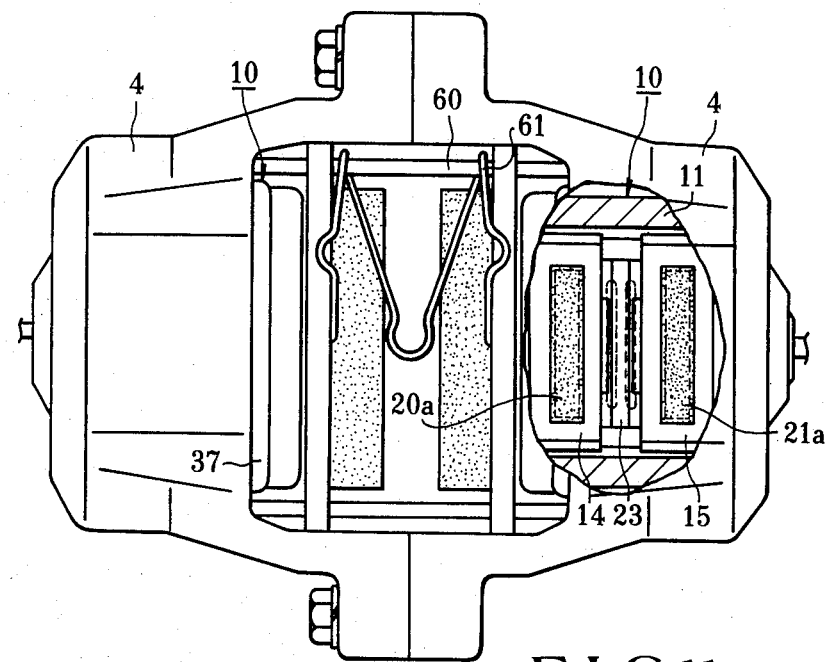
FIGS. 11 and 12 are respectively a plan view and a sectional side view of a brake apparatus according to another embodiment of the present invention.
Figure 12:
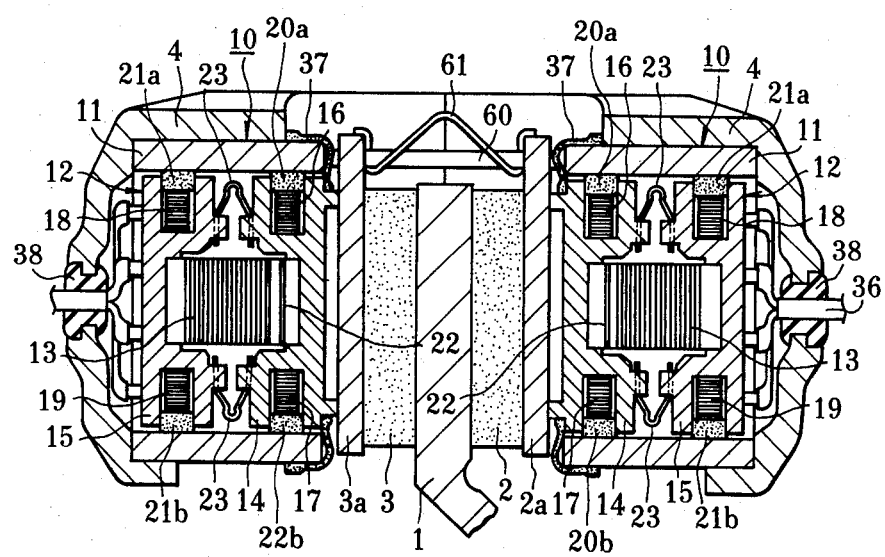

In the above embodiment, the brake apparatus of the present invention is applied as a single cylinder type disc brake. The present invention is not limited to the particular embodiment described above, but can be extended to various types of brake apparatuses. For example, FIGS. 11 and 12 show another embodiment wherein the present invention is applied to an opposed cylinder type disc brake. In this case, actuator mechanisms 10 consisting of piezoceramic elements are disposed on two sides of a disc. Friction pads 2 and 3 are respectively operated by the actuator mechanisms 10 and are brought into tight contact with two surfaces of the disc 1 to produce a braking force. A detailed construction thereof is substantially the same as that of the conventional brake apparatus and can be readily understood by those skilled in the art. Reference numeral 60 denotes a pad pin; and 61, a compression spring.

The same effect as in the previous embodiment can also be obtained in this embodiment.

Figure 13A:
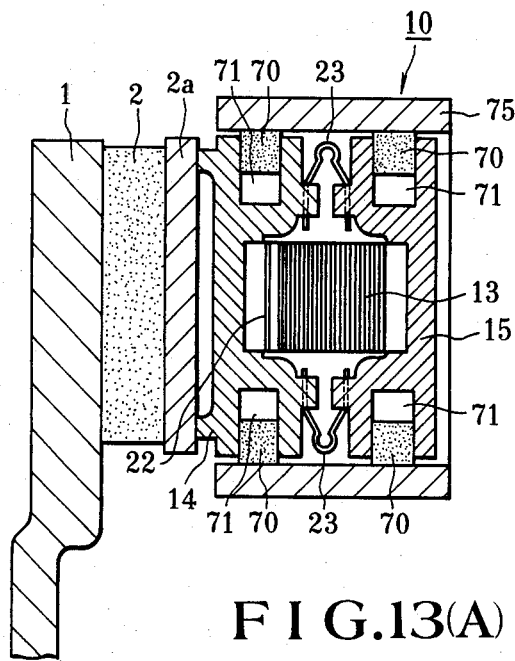
Figure 13B:
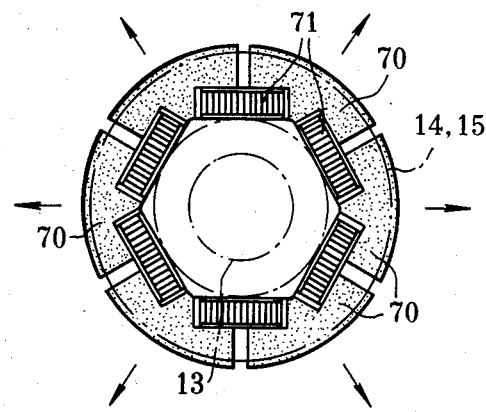

In the second embodiment, two pairs of upper and lower restraining piezoceramic elements 16 and 17, and 18 and 19 are disposed in a pair of holders 14 and 15 for holding two ends of a moving piezoceramic element 13, respectively. The present invention is not limited to the second embodiment, but can be modified as shown in FIGS. 13A and 13B. Referring to FIGS. 13A and 13B, arcuated friction pads 70 are arranged in the holders 14 and 15 along the circumferential direction. A plurality of restraining piezoceramic elements 71 are connected to two ends of every two adjacent pads 70. In this case, the pads 70 are moved outward/inward along the radial direction upon elongation/contraction of the piezoceramic elements 71.

Figures 14A, 14B:
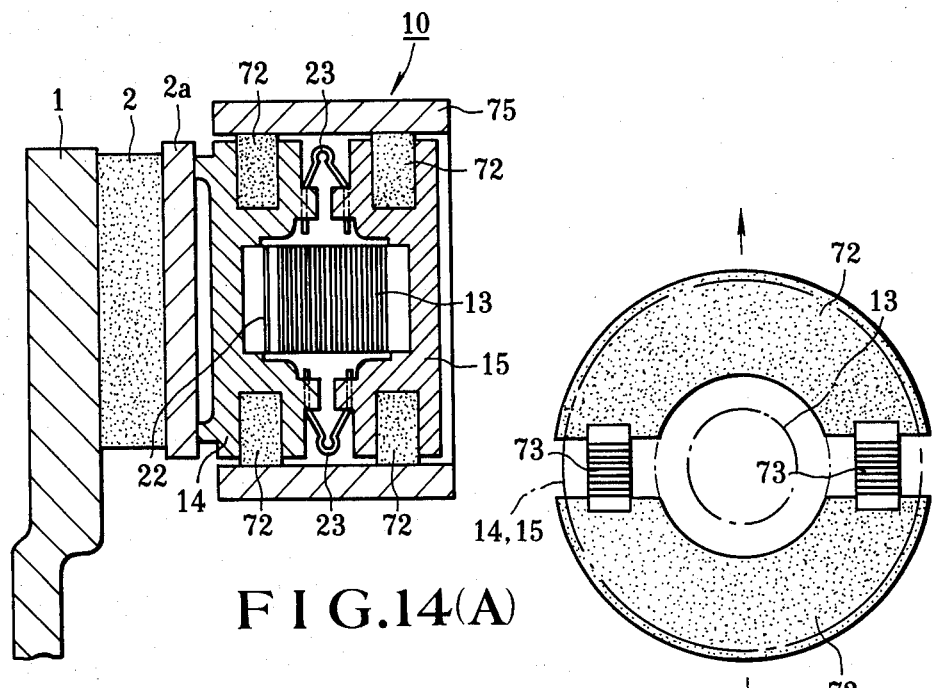
Figure 15:
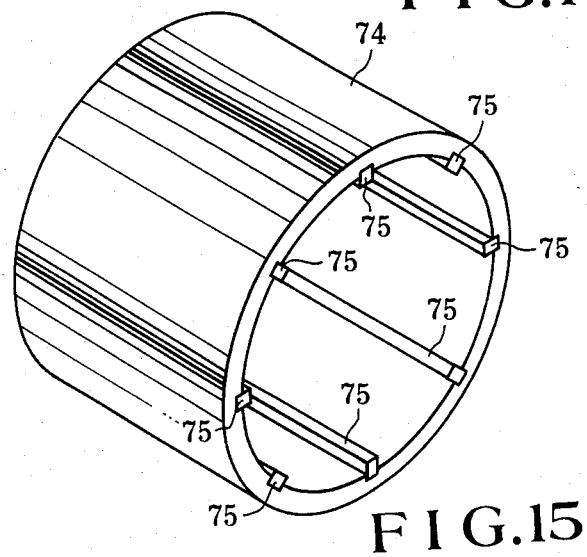

In another modification illustrated in FIGS. 14A and 14B, restraining piezoceramic elements 73 are coupled to ends of each of semicircular friction pads 72. In this case, when the piezoceramic elements 73 are elongated/contracted, the pads 72 are moved outward/inward. In these modifications, a cylindrical housing 74 may be used as shown in FIG. 15. Rail electrodes 75 may be mounted on the inner wall surface of the cylindrical housing 74 in the same manner as in the previous embodiments.

As has been described in detail according to the present invention, elongation/contraction properties of piezoceramic elements in the brake apparatus are effectively utilized to constitute an actuator. According to an aspect of the present invention, the piezoceramic elements are operated so as to bring the friction pads into tight contact with the disc so as to clamp the disc, thereby generating the braking force. According to another aspect of the present invention, the movable assembly subjected to intermittent shifting can be reciprocated within the cylindrical housing. According to still another aspect of the present invention, a plurality of friction pads are arranged in a circular form and the restraining piezoceramic elements are connected to two ends of each two adjacent friction pads. The piezoceramic elements are operated to move the pads inward to generate a braking force. In this manner, the braking force can be electrically generated with a simple construction. A proper braking force can be produced as the driver depresses the brake pedal. Various types of brake control operations such as anti-skid or brake pumping can be easily and properly performed to satisfy every need. The present invention provides various advantages in that the apparatus as a whole is simple, compact, lightweight and low cost.

What is claimed is:

1. A disc brake apparatus having an actuator mechanism for bringing a friction member into tight contact with a disc braking member so as to obtain a braking force, said actuator mechanism comprising:
   a moving piezoceramic member which can be extended/contracted along an urging direction of said friction member;
   a pair of holders respectively disposed between corresponding ends of said friction member and said moving piezoceramic member and at a rear end of said piezoceramic member, said holders being translatable along said direction; and
   a pair of restraining means which are respectively mounted on said pair of holders and which comprises restraining piezoceramic members for selectively restraining movement of said holders and said moving piezoceramic member with respect to a fixing means in a direction parallel to the urging direction.

2. An apparatus according to claim 1, wherein said fixing means comprises a cylindrical body which surrounds said holder and said moving piezoceramic member, and said restraining means includes a plurality of restraining piezoceramic members which can be radially extended/contracted in said cylindrical body, said plurality of restraining piezoceramic members being arranged at equal intervals in a circular form.

3. An apparatus according to claim 2, wherein said cylindrical body has a cross section of a rectangular shape.

4. An apparatus according to claim 2, wherein said cylindrical body has a cross section of a circular shape.

5. An apparatus according to claim 2, wherein a plurality of rail electrodes are mounted on an inner wall surface of said cylindrical body to be parallel with an extension/contraction direction of said moving piezoceramic member, said moving and restraining piezoceramic elements being powered through contact elements slidably contacting said plurality of rail electrodes.

6. An apparatus according to claim 2, wherein a plurality of guide rails are mounted on an inner wall surface of said cylindrical body to be parallel to an extension/contraction direction of said moving piezoceramic element.

7. An apparatus according to claim 6, wherein said guide rails mounted on said cylindrical body are formed symmetrically about said moving piezoceramic member.

8. A brake apparatus according to claim 1, wherein said pair of restraining piezoceramic members comprises means alternately driven in synchronism with movement of said moving piezoceramic member.

9. A brake apparatus having an actuator mechanism for bringing a friction member into tight contact with a braking member so as to obtain a braking force, said actuator mechanism comprising:
- a moving piezoceramic member which can be elongated/contracted along an urging direction of said friction member;
- a holder disposed between opposing ends of said friction member and said moving piezoceramic member to couple said friction member and said moving piezoceramic member;
- a cylindrical body;
- a plurality of arcuated pad members radially disposed within said cylindrical body; and
- a plurality of restraining means for engaging with end portions of every two adjacent arcuated pad members and for acting so as to bring said arcuated pad members into tight contact with an inner wall surface of said cylindrical body or to separate said arcuated pad members from the inner wall surface thereof,
- said holder supporting said arcuated pad members and said restraining means.

10. In apparatus according to claim 9, wherein said restraining means comprise restraining piezoceramic members to be extended/contracted in a radial direction of said cylindrical body.

11. An apparatus according to claim 9, wherein said cylindrical body has a cross section of a circular shape.

12. A brake apparatus having an actuator mechanism for bringing a friction member into tight contact with a braking member so as to obtain a braking force, said actuator mechanism comprising:
- a moving piezoceramic member which can be elongated/contracted along an urging direction of said friction member;
- a holder disposed between opposing ends of said friction member and said moving piezoceramic member to couple said friction member and said moving piezoceramic member;
- a cylindrical body;
- two semicircular pad members whose arcuated surfaces oppose each other in said cylindrical body;
- a plurality of restraining means, disposed between opposing ends of said semicircular pad members, for acting to bring said semicircular pad members into tight contact with an inner wall surface of said cylindrical member or to separate said semicircular pad members from the inner wall surface thereof,
- said holder supporting said semicircular pad members and said restraining means.

13. An apparatus according to claim 1, wherein tension springs are hooked between said pair of holders to urge said pair of holders together.

14. An apparatus according to claim 9 further including an additional holder disposed at a rear end of said piezoceramic member, and tension springs hooked between said holders to urge said holders together.

15. An apparatus according to claim 9 further including a force sensor arranged between said moving piezoceramic member and the adjacent holder for detecting the force exerted by said moving piezoceramic member along said urging direction.

16. An apparatus according to claim 1 further including a force sensor arranged between said moving piezoceramic member and the adjacent holder for detecting the force exerted by said moving piezoceramic member along said urging direction.

* * * * *